(12) United States Patent
Adrain

(10) Patent No.: US 10,470,544 B2
(45) Date of Patent: Nov. 12, 2019

(54) CELL PHONE CASE

(71) Applicant: John B. Adrain, Frisco, TX (US)

(72) Inventor: John B. Adrain, Frisco, TX (US)

(*) Notice: Subject to any disclaimer, the term of this patent is extended or adjusted under 35 U.S.C. 154(b) by 0 days.

(21) Appl. No.: 16/020,685

(22) Filed: Jun. 27, 2018

(65) Prior Publication Data

US 2019/0000204 A1 Jan. 3, 2019

Related U.S. Application Data

(60) Provisional application No. 62/527,476, filed on Jun. 30, 2017.

(51) Int. Cl.
| | |
|---|---|
| *H04M 1/21* | (2006.01) |
| *A45C 15/00* | (2006.01) |
| *A45C 11/00* | (2006.01) |
| *H04B 1/3888* | (2015.01) |
| *B26B 11/00* | (2006.01) |
| *B25F 1/04* | (2006.01) |
| *H04M 1/18* | (2006.01) |
| *B26B 1/02* | (2006.01) |

(52) U.S. Cl.
CPC .............. *A45C 15/00* (2013.01); *A45C 11/00* (2013.01); *B25F 1/04* (2013.01); *B26B 11/006* (2013.01); *H04B 1/3888* (2013.01); *H04M 1/185* (2013.01); *H04M 1/21* (2013.01); *A45C 2011/002* (2013.01); *B26B 1/02* (2013.01)

(58) Field of Classification Search
CPC ... H01M 2/1094; H01M 2/1066; A45C 11/00; A45C 15/00; H04B 1/3888; B26B 1/02; B26B 11/006; B25F 1/04; H04M 1/21
USPC .............. 524/116; 206/320; 381/334; 705/44
See application file for complete search history.

(56) References Cited

U.S. PATENT DOCUMENTS

2012/0074006 A1* 3/2012 Monaco .................. H04M 1/15 206/320

* cited by examiner

*Primary Examiner* — Phuoc H Doan
(74) *Attorney, Agent, or Firm* — Bodi Law LLC

(57) ABSTRACT

A case for a communication device such as a cell phone, said case including a deployable and retractable tool.

22 Claims, 6 Drawing Sheets

CELL PHONE CASE

CROSS-REFERENCES TO RELATED APPLICATIONS

This application claims the benefit of U.S. Provisional Patent Application Ser. No. 62/527,476 filed on Jun. 30, 2017 and incorporated herein by reference.

BACKGROUND

Cell phones are ubiquitous in modern society, and hence are carried nearly everywhere. Tools, such as knives, wrenches, screw drivers, etc. have proven to be useful for a number of different situations, and hence it is beneficial to have tools on one's person as often as possible. In particular, a tool such as a knife is useful for many purposes, not the least of which is self-defense. A new communication device case which combines a tool and a cell phone into a single package would be beneficial.

SUMMARY

Provided are a plurality of example embodiments, including, but not limited to, a cell phone case that provides a housing that incorporates a tool that can be deployed when desired, and retracted in other situations, where the case can be removed so that the tool is not taken into locations where such tools may be prohibited.

Also provided is a case for a communication device, comprising: a tool; deployment structure including at least one spring configured to provide a force to retract and/or deploy the tool; a front portion comprising an opening to access a screen of the communication device, the front portion having a peripheral frame around the opening and at least one opening to accommodate a speaker in the communication device; a back portion comprising a base and a frame surrounding a periphery of the base. The base includes a tool receptacle configured to receive the tool and the deployment structure; and a switch is connected to the deployment structure, wherein the switch is configured to deploy the tool from the case upon activation of the switch.

Further provided is a case for a communication device, comprising: a tool; deployment structure including at least one spring configured to provide a force to retract and/or deploy the tool; a front portion comprising an opening to access a screen of the communication device, the front portion having a peripheral frame around the opening and at least one opening to accommodate a speaker in the communication device; a back portion comprising a base and a frame surrounding a periphery of the base. The base includes a tool receptacle configured to receive the tool and the deployment structure, and the back portion includes a receptacle for receiving the tool and the deployment structure.

The above case also includes a cover for covering the receptacle to enclose the tool and the deployment structure within the receptacle of the back portion; and a switch connected to the deployment structure, wherein the switch is configured to deploy the tool from the case upon alternative activation of the switch.

Further provided is case for a communication device, comprising: a tool including a sharpened blade; deployment structure including at least one spring configured to provide a force to retract and/or deploy the tool; a front portion comprising an opening to access a screen of the communication device, the front portion having a peripheral frame around the opening and at least one opening to accommodate a speaker in the communication device; a back portion comprising a base and a frame surrounding a periphery of the base, wherein the base includes a tool receptacle configured to receive the tool and the deployment structure, wherein the back portion includes a receptacle for receiving the tool and the deployment structure; a cover for covering the receptacle to enclose the tool and the deployment structure within the receptacle of the back portion; a plurality of buttons on a side of the case each configured to actuate a different corresponding input device on the communication device; and a switch connected to the deployment structure, wherein the switch is configured to deploy and retract the tool from the case upon alternative activations of the switch.

In addition is provided any of the above cases where the communication device is a cell phone.

Also provided are additional example embodiments, some, but not all of which, are described hereinbelow in more detail.

BRIEF DESCRIPTION OF THE DRAWINGS

The features and advantages of the example embodiments described herein will become apparent to those skilled in the art to which this disclosure relates upon reading the following description, with reference to the accompanying drawings, in which.

DETAILED DESCRIPTION OF THE EXAMPLE EMBODIMENTS

Provided is a cell phone case that has a deployable tool, such as a double action switch blade, built in. The phone can be removed from the case for taking with the user when the user travels in a secured region, such as by commercial air. The tool can be provided with bolt cut outs in the toll so that the tool can be used as an emergency wrench, and additional features could be provided to use it as other tools, such as providing a screw driver, or bottle opener function, for example.

Figure 4:
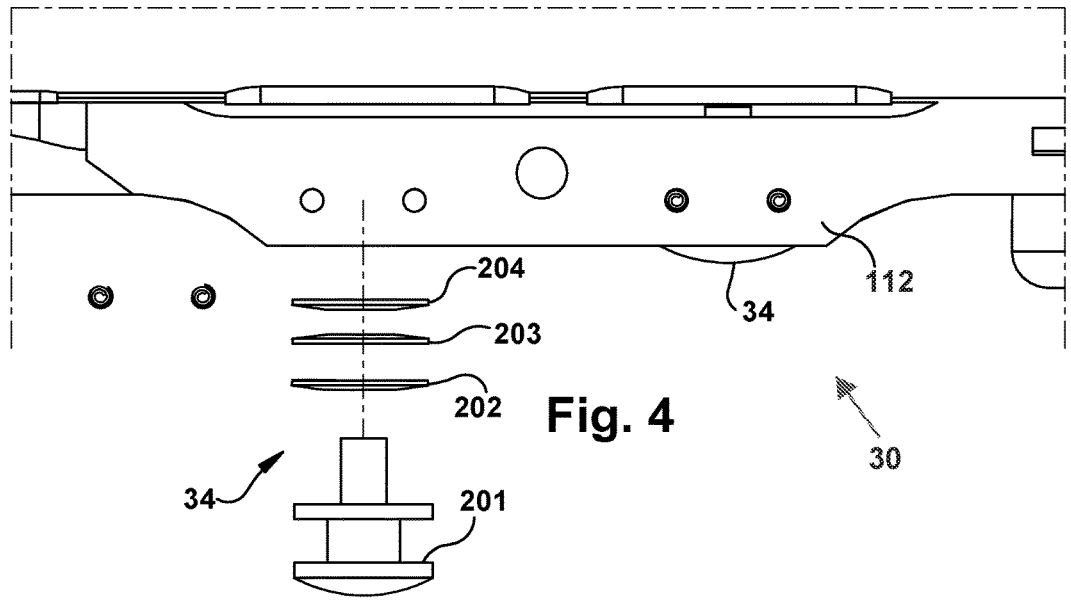
FIG. 4 is schematic showing example structure for a control button of the example case of FIG. 1.
Figure 5:
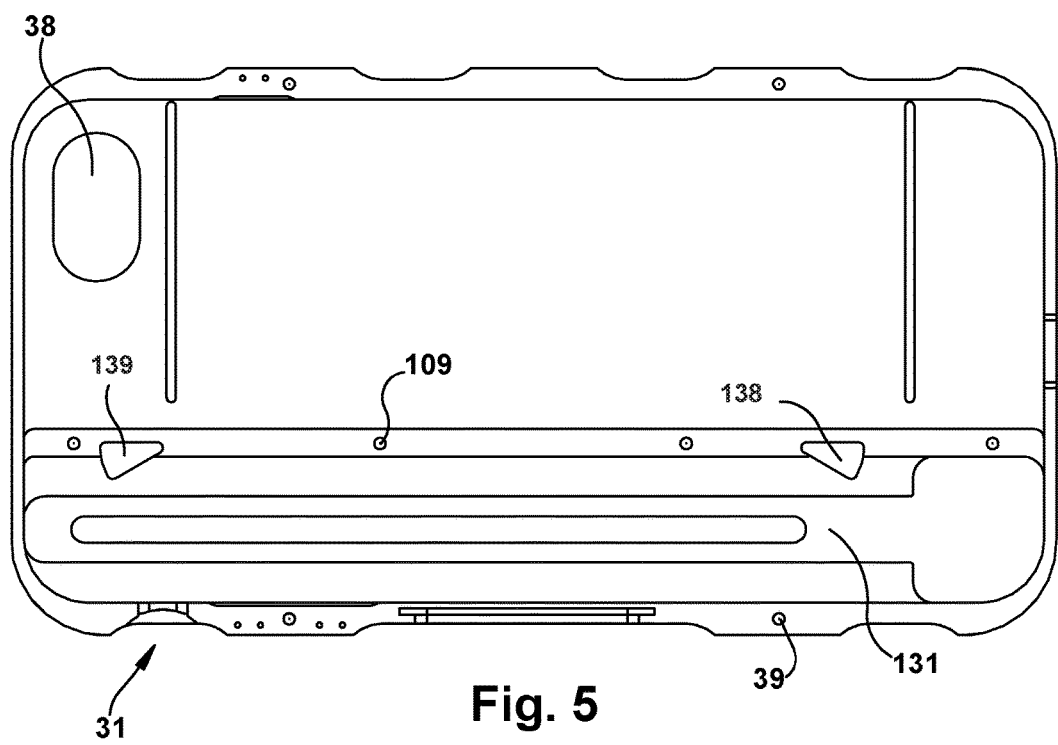
FIG. 5 is a schematic showing an example base of the example case.
Figure 6A:
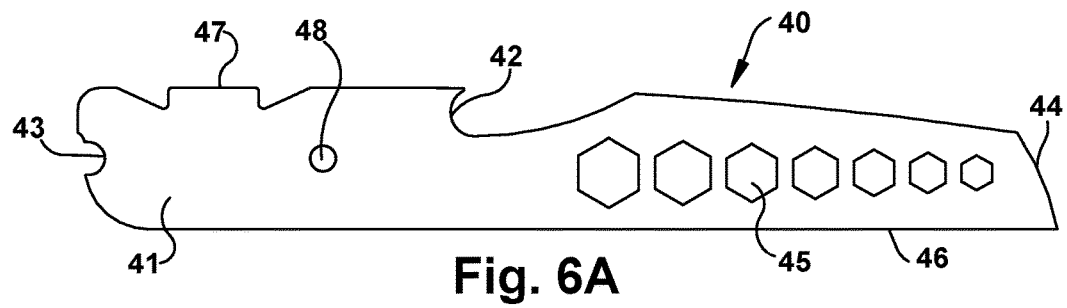
FIG. 6A shows a first example tool for use with any of the example cases.
Figure 6B:
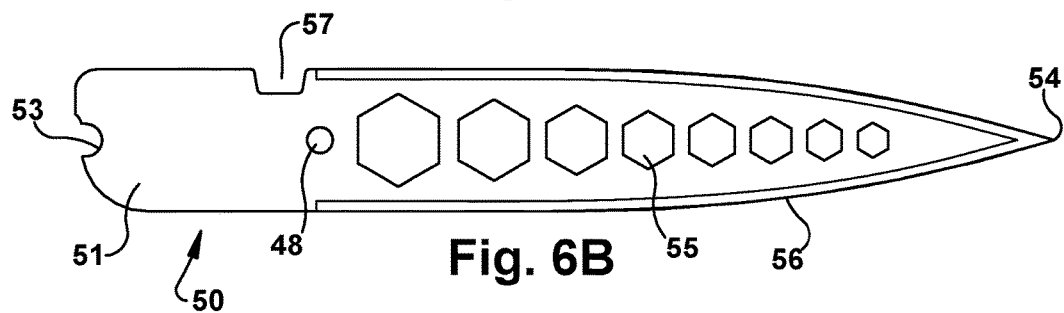
FIG. 6B shows a second example tool for use with any of the example cases.

FIGS. 1-5 are schematic drawings showing first example embodiments of a case with two different types of example tools in FIGS. 6A and 6B, and FIGS. 7-8 show another example embodiment with one of the example tools of FIG. 6B. Other possible tools include a comb, screwdriver, pliers, bottle opener, hex wrench, nail file or nail clipper, scissors, pick, or any other useful type of tool. Furthermore, the tools may be interchangeable, such that a user can change out one type of tool for another type of tool. In addition, multiple tools might be provided such as in a Swiss army knife.

Figure 1:
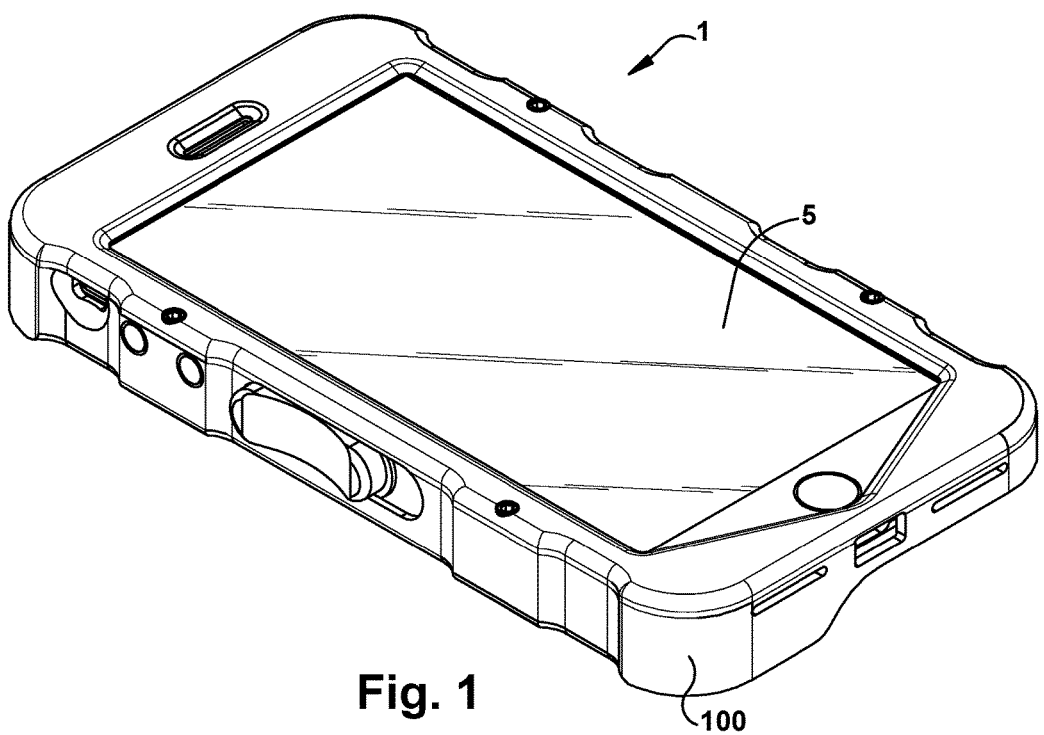
FIG. 1 shows a schematic of a perspective view of a front of an example cell phone tool case system.

FIG. 1 shows a schematic of a perspective view of the front of an example assembled system 1 including a cell phone 5 installed in an example case 100. Note that the device looks much like a typical cell phone and case combination, but might be slightly thicker than a traditional case.

Figure 2:
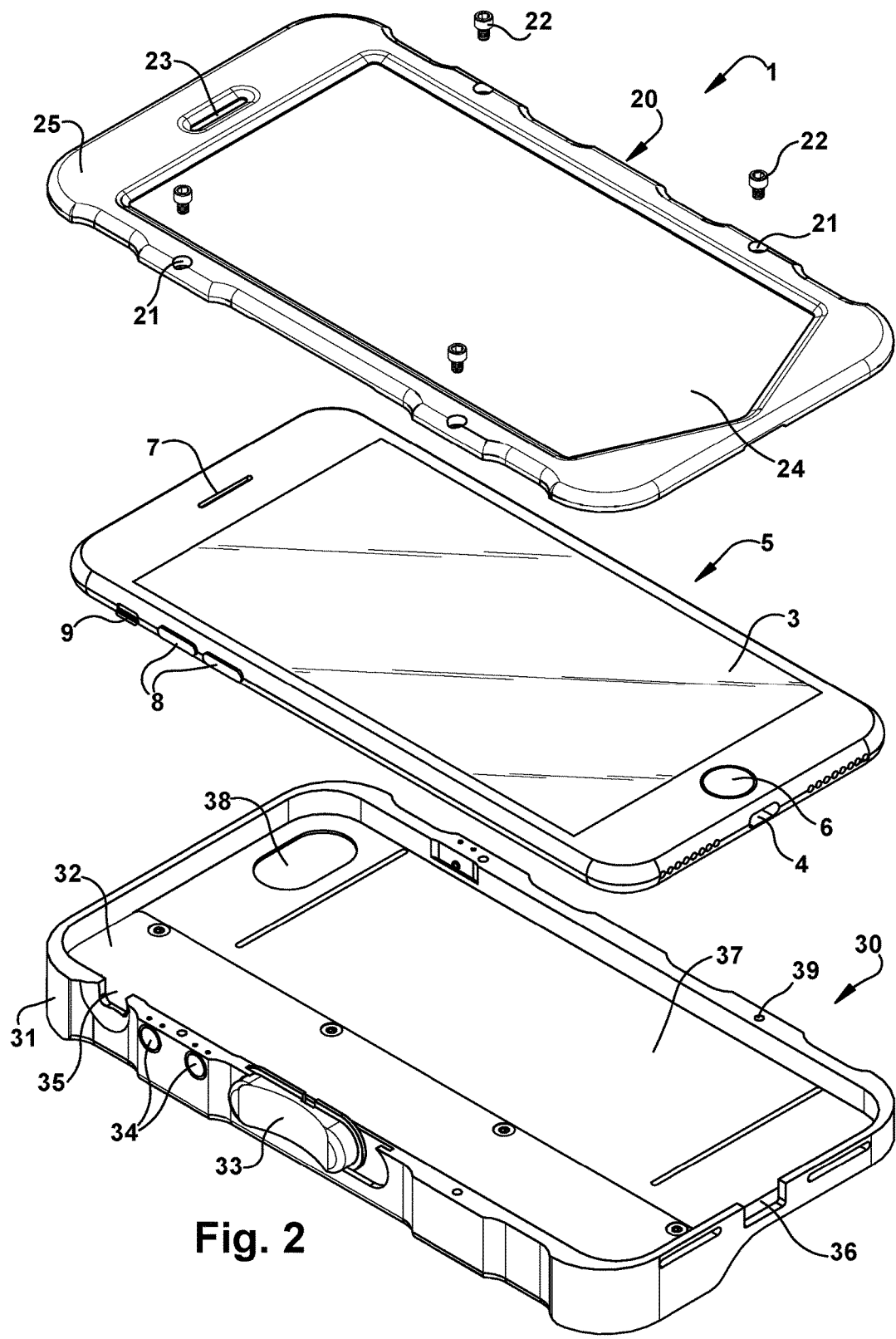
FIG. 2 is a schematic of a partially exploded view of the system of FIG. 1.

FIG. 2 is a schematic of an exploded view of the system 1 of FIG. 1. The cell phone 5 can be any appropriate cell phone or another type of communication device, and in this example the cell phone 5 has a touch-screen 3, a camera 6, a charging port 4, a speaker 7, a power switch or port 9, and a pair of volume switches 8. Of course, other cell phone embodiments can also be utilized by other example embodiments of the case 100. Additional access ports can be provided to access memory cards, a battery, or other cell phone ports, as desired.

FIG. 2 also shows the case 100 having a front portion 20, and a back portion 30. The front portion 20 has an opening 24 to accommodate the cell phone screen 3, and an opening 23 to accommodate the cell phone speaker 7, and a frame 25 to give the case strength and to protect the cell phone. Note that the opening 24 could be provided with a protective sheet to protect the cell phone screen but that also accommodates any touch screen operation of the cell phone. Screws 22 are provided with corresponding holes 21 to secure the front portion 20 to the back portion 30.

FIG. 2 further shows the back portion 30 having an opening 38 to accommodate a camera on the rear of the cell phone 5 (not shown). An opening 36 is provided to accommodate the cell phone charging port 4, a pair of buttons 34 are provided to accommodate the cell phone volume switches 8, and an opening 35 is provided to accommodate the cell phone port 9, whereas if item 9 is a power switch the opening 35 can be replaced with another button 34. The back portion 30 also has a back cover 37, a base 31 with walls to add strength and protect the cell phone, and a tool cover 32 to cover an enclosed tool provided in a tool receptacle (discussed in more detail below). A release switch 33 is provided to release and expose the tool, and may also be used to retract the tool.

Threaded holes 39 are provided in the back portion to receive the screws 22 to secure the front portion 20 of the case 100 to the back portion 30. Note that for ease of removal, the screws 22 and corresponding holes might be replaced with snaps or other securing structures that more easily allow the case 100 to be opened to allow for removal of the cell phone 5, such as for entry into locations where the enclosed tool might be prohibited (e.g., commercial air travel).

Figure 3:
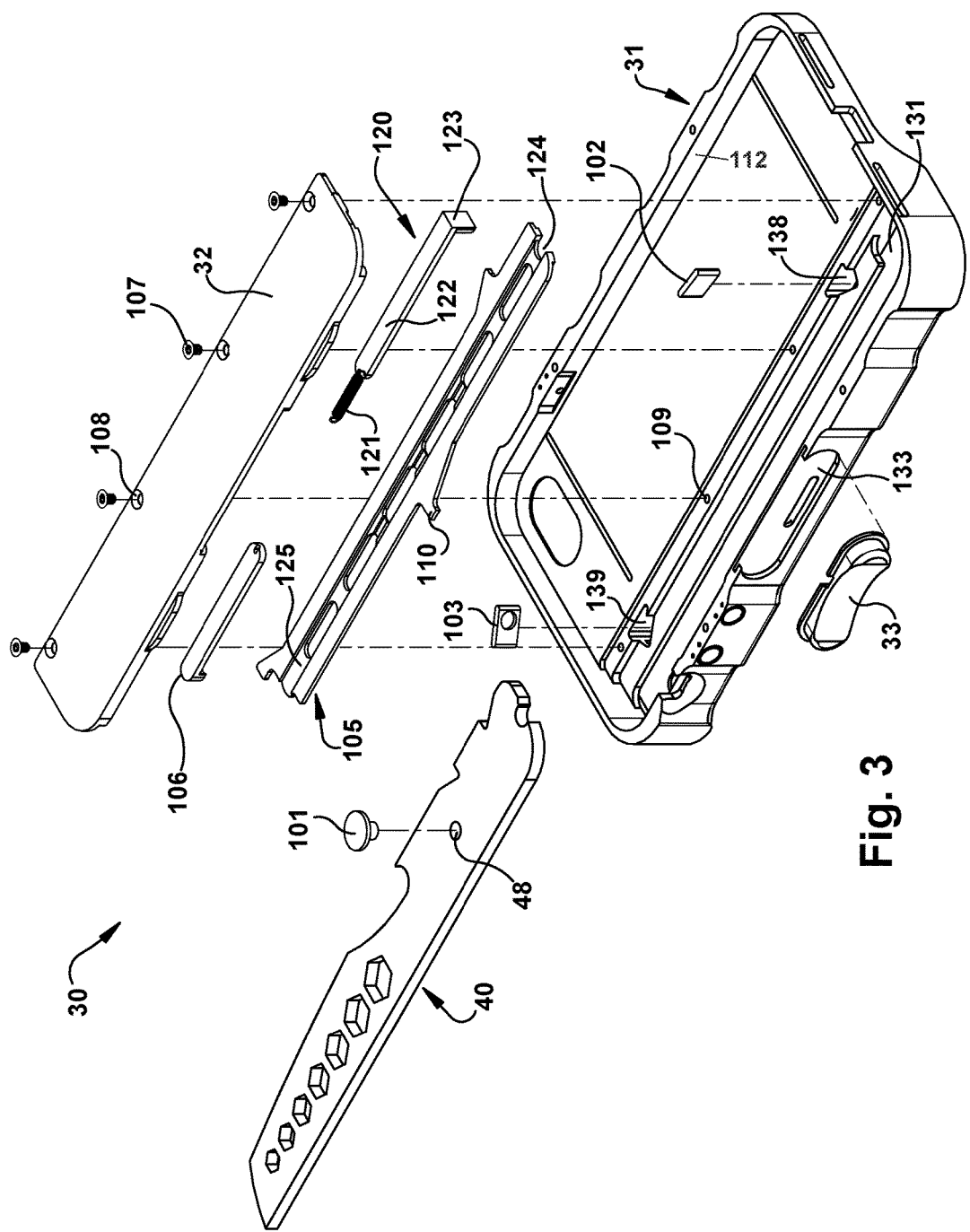
FIG. 3 is a schematic of an exploded view of an example bottom portion of the case of the system of FIG. 1 including an example tool.

FIG. 3 is a schematic that shows an exploded view of the back portion 30 of the case 100, which has a base 31 with a frame having walls 112 to provide structure and strength to the cover and to enclose the cell phone and tool. Note that as an alternative, the frame of the front portion could instead be provided with the walls 112.

The tool cover 32 is shown having holes 108 are provided to accommodate screws 107 that are secured to the base 31 using associated threaded holes 109. The tool cover 32 covers the example tool 40, and tool deployment hardware including the spring rod 120, rail 105, and bar 106 which are all provided in a receptacle portion of the base 31. Release switch 33 is configured to connect to base 31 at switch receptacle 133.

Figure 7:
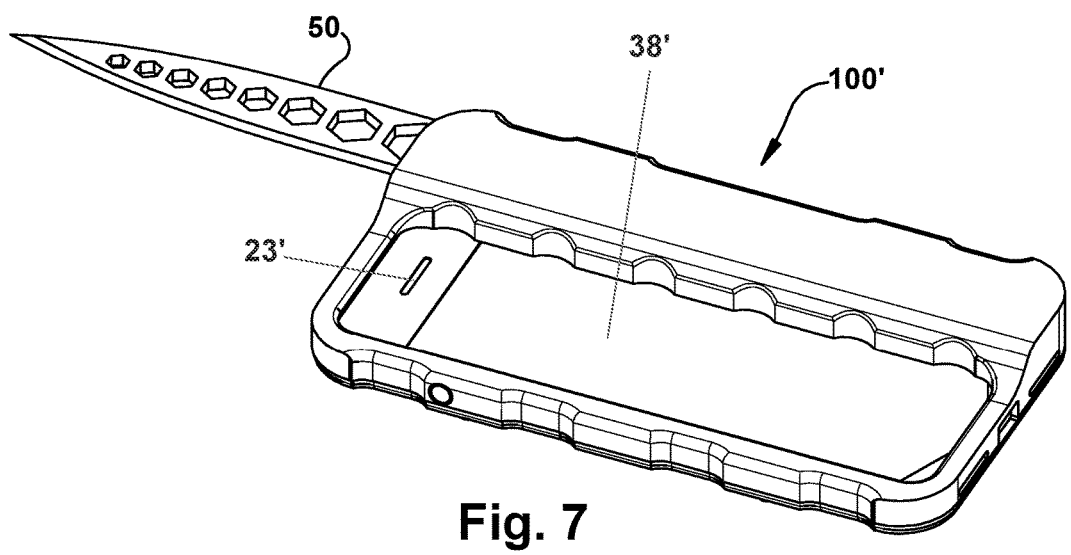
FIG. 7 shows an alternative example case with the example tool of FIG. 6B deployed.
Figure 8:
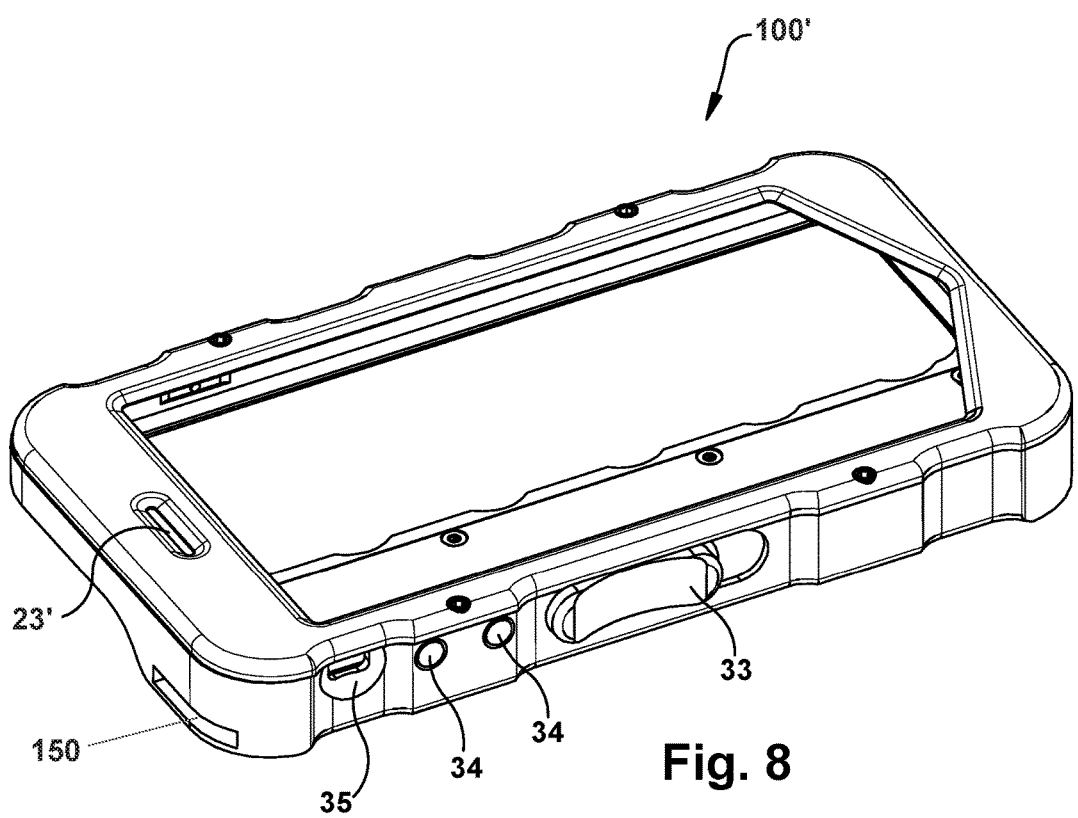
FIG. 8 shows the alternative example assembled case of FIG. 7 without a cell phone installed and with the tool retracted.

The tool deployment hardware includes the spring rod 120 comprised of a spring 121 and a spring base 122 having a tab 123 which are installed in a slot 125 in the rail 105 at a rear location of the slot 125, with the tab 123 engaging a gap portion of the rail 105. Bar 106 is installed at a front portion of the slot 125. The rail 105 has a tab 110 which engages the release switch 33. A pair of holes 138, 139 receive respective tabs 102, 103, which engage portions of the rail 105. The tool 40 is provided with a hole 48 to receive the fastener 101 to connect the tool 40 to the rail 105. Note that the deployment hardware components are provided with additional structure as shown in the drawings that cooperate for the assembly and operation of the tool as part of the assembled case 100 (or 100' as shown in FIGS. 7 & 8). Additional structure not shown may also be provided.

When assembled, in this example embodiment the back portion 30 encloses the tool 40 (or an alternative tool) in a manner where the device operates as a double-action switch blade device, with the release switch operating to extend and retract the tool 40 using the spring 121 providing the compression and tension to automatically extend and retract the tool 40. The details of this operation are not provided, as the operation of double action switch blades is known in the art, such as the switchblades provided by Microtech Knives, Inc. Alternative solutions using more than one spring, or providing a single-action device or other types of operation can also be supported. Additional structure for more easily retracting the tool or providing additional force might also be provided. Notice that various indentations may be provided on the outside of the walls 112 of the case for ease of holding and operating the device.

FIG. 4 is a schematic view of a portion of a top view of the back portion 30 showing the structure used to provide the buttons 34 in a side wall 112 of the case 100, including a button tab 201 along with washer springs 202, 203, and 204 that allow the button to operate as a substitute to direction manipulation of the control buttons already provided on the cell phone. The washer springs 202, 203, and 204 cooperate with the button tab 201 to provide such operation.

FIG. 5 is a schematic view of the base 31 without much of the tool deployment hardware or tool installed, showing various features described above regarding FIG. 4 in more detail. In particular, the tool receptacle 131 includes structure and slots for accommodating the tool deployment hardware components for operating the tool (e.g., deployment and retraction), and also may include one or more slots for accommodating one or more antennas for the phone. Alternatively, an antenna might be provided external to the case, or extendible from the case. Adding an antenna may help overcome any attenuation issues caused by the structure of the case itself. Also, the antenna function might be incorporated in the tool itself, or otherwise be depoyable.

FIGS. 6A and 6B show alternative tools 40, 50 that can be used in the case 100. A wrench tool 40 provided with a plurality of wrench slots 45 of various sizes to accommodate nuts or bolts of different standard sizes is provided. The tool may have a blunt end 44 that might act as a screwdriver or wedge (or if sharpened as a knife), a bottle opener structure 42 to remove caps from bottles, and various other structures 43, 47 to support assembly and operation. The body 41 will be comprised of a strong material, such as stainless steel or surgical steel, for example, or a hardened aluminum or other strong material, to support the function(s) of the tool. The edge 46 may be provided blunt, or sharpened as a knife.

As an alternative tool, blade 50 is provided with a sharp tip 50 and sharpened blade end 56. This blade 50 can also be provided with wrench slots 55, and structures 57, 53 to enable assembly, and the body 51 will likewise be constructed of a strong material such as stainless steel or surgical steel, for example, or a hardened aluminum or other strong material. Use of the tool 50 effectively turns the case into a potential defensive weapon like a switch blade.

FIG. 7 shows another example assembled case 100" showing blade 50 in an extended (deployed) position without a cell phone installed, with slot 23" for a cell phone speaker, and where a large opening 38" is provided in the back portion for exposing any camera or for battery access of the cell phone when installed. FIG. 8 shows the assembled second example case 100" without an installed cell phone and with the tool retracted through tool exit slot 150 (and hence not shown). This second example case can use similar tool deployment hardware as described above (see FIG. 3) for the first example case.

The primary components of any example case, including the front portion 20 and the base 31, can be comprised of a number of different lightweight materials, such as aluminum, aluminum alloy (e.g., including magnesium), titanium, composite materials, or even plastics. However, stronger materials such as lightweight metals or metal alloys are preferred. In some cases, to maximize strength, a heavier metal such as stainless steel or a painted steel may be used. Decorative panels (that might be made of a plastic material or cloth, for example) might be provided over the basic stronger case to further customize the design.

Note that the case can be constructed of a material that shields the user from electromagnetic fields of the phone. Aluminum or steel cases would provide such shielding. In addition, the ports for the speaker can be designed to help direct the speaker output to the user, effectively amplifying the sound like a megaphone.

The tool can be constructed of titanium, surgical steel, stainless steel, or alloys thereof, with strength and durability at a premium. The device will be modular in that various components can be swapped out for different sized components in order to accommodate different models of cell phones, and various decorative panels can be provided, or the case may be painted in different colors or styles. Furthermore, one or more magnets can be provided along with slots to hold certain tools, such as hex wrenches, screw drivers, etc.

Furthermore, similar cases can be provided to accommodate other types of communication devices, such as walkie-talkies, satellite phones, home phones, cameras, etc. by adjusting the sizes and locations of the various features to accommodate the particular communication device.

The case can also be configured to be easily disassembled, so that the phone can be easily removed from the case. In such a situation, rather than using the screws 22 as shown in FIG. 2 to hold the case together, snap connectors or clips might be used so that the case can be separated and the phone removed without the use of any tools, such as are currently found on some cell phone cases. Alternatively, other types of connectors could be used that are easily manipulated without tools, such as Velcro, magnets, latches, etc.

Or an removable hex (allen) wrench can be provided with the phone for use with hex screws for disassembling the case. In such a case, the holes in the front portion of the device might also be threaded to hold the screws in place when partially removed to disassemble the case to avoid losing the screws.

As an alternative, the case may be designed such that the phone can slide out of a slot on a side of the device, with the slot be covered or otherwise closed during normal use to avoid the phone sliding out inadvertently.

Finally, as suggested above, the tool (e.g., tool 40, 50 in FIGS. 6A & 6B) may be replaceable with other tools (e.g., each other, or additional tools such as a comb, wrench, scissors, nail file, screw driver, etc.) For example, the case might be sold with a comb tool, but the owner may be able to replace the comb tool with a tool such as shown in the example embodiments of FIG. 6A or FIG. B, for example.

Note that although it is contemplated that the case of the example embodiments will be provided as an after-market device that can be installed with a separately purchased communication device, the case might be sold in conjunction with the communication device as an integrated package.

Many other example embodiments can be provided through various combinations of the above described features. Although the embodiments described hereinabove use specific examples and alternatives, it will be understood by those skilled in the art that various additional alternatives may be used and equivalents may be substituted for elements and/or steps described herein, without necessarily deviating from the intended scope of the application. Modifications may be necessary to adapt the embodiments to a particular situation or to particular needs without departing from the intended scope of the application. It is intended that the application not be limited to the particular example implementations and example embodiments described herein, but that the claims be given their broadest reasonable interpretation to cover all novel and non-obvious embodiments, literal or equivalent, disclosed or not, covered thereby.

What is claimed is:

1. A case for a communication device, comprising:
a tool including a sharpened blade;
deployment structure configured to provide a force to retract and/or deploy said tool;
a front portion comprising an opening to access a screen of the communication device, said front portion having a peripheral frame around said opening and at least one opening to accommodate a speaker in the communication device;
a back portion comprising a base and a frame surrounding a periphery of said base, wherein said base includes a tool receptacle configured to receive said tool and said deployment structure; and
a switch connected to said deployment structure, wherein said switch is configured to deploy said tool from said case upon activation of said switch.

2. The case of claim 1, wherein said tool is configured to be replaceable by another type of tool.

3. The case of claim 1, wherein said includes a spring configured to automatically deploy said tool upon activation of said switch.

4. The case of claim 1, wherein said tool is comprised of a plurality of openings configured in a hexagonal pattern for acting as a wrench.

5. The case of claim 1, wherein said communication device is a cell phone and wherein said opening in said front portion exposes a screen of said cell phone.

6. The case of claim 5, further comprising a plurality of buttons on a side of said case each configured to actuate a different corresponding input device on said cell phone.

7. The case of claim 1, wherein said front portion and said back portion are configured to be disassembled for removal of said communication device without using any tool.

8. The case of claim 1, wherein said back portion includes an opening to accommodate a camera on a back of said communication device.

9. The case of claim 1, wherein said switch is also configured to retract said tool from said case upon alternative activation of said switch.

10. A case for a communication device, comprising:
a tool;
deployment structure including at least one spring configured to provide a force to deploy said tool;
a front portion comprising an opening to access a screen of the communication device, said front portion having a peripheral frame around said opening and at least one opening to accommodate a speaker in the communication device;
a back portion comprising a base and a frame surrounding a periphery of said base, wherein said base includes a tool receptacle configured to receive said tool and said deployment structure, wherein said back portion includes a receptacle for receiving said tool and said deployment structure;
a cover for covering said receptacle to enclose said tool and said deployment structure within the receptacle of said back portion; and
a switch connected to said deployment structure, wherein said switch is configured to automatically deploy said tool from said case via action of said spring upon activation of said switch.

11. The case of claim 10, wherein said tool is configured to be replaceable by another type of tool.

12. The case of claim 10, wherein said tool includes a sharpened blade.

13. The case of claim 10, wherein said tool is comprised of a plurality of openings configured in a hexagonal pattern for acting as a wrench.

14. The case of claim 10, wherein said communication device is a cell phone and wherein said opening in said front portion exposes a screen of said cell phone.

15. The case of claim 14, further comprising a plurality of buttons on a side of said case each configured to actuate a different corresponding input device on said cell phone.

16. The case of claim 10, wherein said front portion and said back portion are configured to be disassembled for removal of said communication device without using any tool.

17. The case of claim 10, wherein said switch is also configured to retract said tool from said case upon alternative activation of said switch.

18. The case of claim 10, further comprising at least one opening to accommodate a communication and/or power port of the communication device.

19. A case for a communication device, comprising:
a tool including a sharpened blade;
deployment structure including at least one spring configured to provide a force to retract and/or deploy said tool;
a front portion comprising an opening to access a screen of the communication device, said front portion having a peripheral frame around said opening and at least one opening to accommodate a speaker in the communication device;
a back portion comprising a base and a frame surrounding a periphery of said base, wherein said base includes a tool receptacle configured to receive said tool and said deployment structure, wherein said back portion includes a receptacle for receiving said tool and said deployment structure;
a cover for covering said receptacle to enclose said tool and said deployment structure within the receptacle of said back portion;
a plurality of buttons on a side of said case each configured to actuate a different corresponding input device on said communication device; and
a switch connected to said deployment structure, wherein said switch is configured to deploy and retract said tool from said case upon alternative activations of said switch, wherein
said communication device is a cell phone.

20. The case of claim 19, wherein said front portion and said back portion are configured to be disassembled for removal of said communication device without using any tool.

21. A case for a communication device, comprising:
a tool;
a spring;
deployment structure configured to provide a force to retract and/or deploy said tool;
a front portion comprising an opening to access a screen of the communication device, said front portion having a peripheral frame around said opening and at least one opening to accommodate a speaker in the communication device;
a back portion comprising a base and a frame surrounding a periphery of said base, wherein said base includes a tool receptacle configured to receive said tool and said deployment structure; and
a switch connected to said deployment structure, wherein said switch is configured to automatically deploy said tool from said case upon activation of said switch via action of said spring.

22. The case of claim 21, wherein said tool includes a sharpened blade.

* * * * *